(12) United States Patent
Shigematsu et al.

(10) Patent No.: US 11,409,542 B2
(45) Date of Patent: Aug. 9, 2022

(54) INFORMATION SHARING BETWEEN OPERATING SYSTEMS OF THE SAME DEVICE

(71) Applicant: LENOVO (Singapore) PTE. LTD., New Tech Park (SG)

(72) Inventors: Yuichi Shigematsu, Yokohama (JP); Kazuo Fujii, Yokohama (JP); Hidetoshi Mori, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/800,829

(22) Filed: Feb. 25, 2020

(65) Prior Publication Data

US 2020/0278872 A1 Sep. 3, 2020

(30) Foreign Application Priority Data

Feb. 28, 2019 (JP) .............................. JP2019-035271

(51) Int. Cl.
| | |
|---|---|
| *G06F 9/4401* | (2018.01) |
| *G06F 13/42* | (2006.01) |
| *G06F 9/54* | (2006.01) |
| *H04W 84/18* | (2009.01) |
| *G06F 3/14* | (2006.01) |

(52) U.S. Cl.
CPC ............ *G06F 9/441* (2013.01); *G06F 3/1446* (2013.01); *G06F 9/546* (2013.01); *G06F 13/4295* (2013.01); *H04W 84/18* (2013.01)

(58) Field of Classification Search
None
See application file for complete search history.

(56) References Cited

U.S. PATENT DOCUMENTS

| 7,098,899 | B1 * | 8/2006 | Ginosar |
| 2017/0337025 | A1 * | 11/2017 | Finnan |
| 2018/0203658 | A1 * | 7/2018 | Files |
| 2019/0146742 | A1 * | 5/2019 | Li |
| 2020/0159289 | A1 * | 5/2020 | Seibert |

FOREIGN PATENT DOCUMENTS

| JP | 10254622 A | 9/1998 |
| JP | 2007279438 A | 10/2007 |
| JP | 2010108447 A | 5/2010 |

* cited by examiner

*Primary Examiner* — Syed A Roni
(74) *Attorney, Agent, or Firm* — Kunzler Bean & Adamson

(57) ABSTRACT

A computing apparatus is provided to improve information sharing between multiple operating systems of the same system, that operate in parallel. The computing apparatus includes a first system having a first display unit and configured to execute processing by a first operating system ("OS"), and configured to display, on the first display unit, display information based on the processing by the first OS. The computing apparatus also includes a second system having a second display unit and configured to execute processing by a second OS, and configured to display, on the second display unit, display information based on the processing by the second OS.

20 Claims, 3 Drawing Sheets

| CATEGORY | SHARED INFORMATION | DETAILS | SHARING METHOD |
|---|---|---|---|
| GENERAL INFORMATION | DATE AND TIME | DATE-AND-TIME INFORMATION | CHIPSET SENDS DATE-AND-TIME INFORMATION THROUGH USB |
| | BATTERY INFORMATION | REMAINING CAPACITY (%) ICON | EC SENDS BATTERY LEVEL INFORMATION THROUGH I2C |
| | LOCATION | LOCATION INFORMATION | CHIPSET SENDS DATE-AND-TIME INFORMATION THROUGH USB |
| | WEATHER | WEATHER INFORMATION | CHIPSET SENDS DATE-AND-TIME INFORMATION THROUGH USB |
| NOTIFICATION | E-mail | MAIL NOTIFICATION ICON | |
| | CALENDAR | EVENT NOTIFICATION | |
| | MESSAGE | CHAT NOTIFICATION ICON | |
| | PHONE CALL | PHONE CALL ICON | |
| | SMS | SMS MESSAGE | |
| | ALARM | ALARM NOTIFICATION | |
| VOICE INSTRUCTION | VOICE ASSISTANT | STATE OF VOICE ASSISTANT (LISTENING, THINKING, SPEAKING, ERROR) | CHIPSET SENDS NOTIFICATION COMMAND THROUGH USB |
| MEDIA | VOLUME | VOLUME INFORMATION | CHIPSET SENDS STATE INFORMATION THROUGH USB |
| | CONTROL INFORMATION | CONTROL INFORMATION ON MEDIA PLAYER | CHIPSET RECEIVES CONTROL INFORMATION THROUGH USB |
| ... | | ... | ... |

FIG. 3

INFORMATION SHARING BETWEEN OPERATING SYSTEMS OF THE SAME DEVICE

FIELD

The subject matter disclosed herein relates to information processing devices and more particularly relates to an improved system and method for sharing information between different operating systems, executing in parallel, on the same device.

BACKGROUND

In some computing devices, such as laptop personal computers, multiple display units are utilized. For example, the laptop may have a main display unit and a secondary display unit. Various kinds of information can be displayed on the secondary display unit. However, the secondary display unit may be controlled by a dedicated operating system, and therefore, it is difficult to easily add a function using the secondary display unit.

SUMMARY

An apparatus is provided to improve information sharing between operating systems of the same device. The apparatus includes a first system having a first display unit and configured to execute processing by a first operating system ("OS"), and configured to display, on the first display unit, display information based on the processing by the first OS. The apparatus also includes a second system having a second display unit and configured to execute processing by a second OS, and configured to display, on the second display unit, display information based on the processing by the second OS. Both the first system and the second system may execute processing in parallel.

In certain embodiments, the first system includes a first system chip configured to execute the processing by the first OS. The second system includes a second system chip configured to execute the processing by the second OS. In certain embodiments, the first system chip and the second system chip are connected through a serial bus interface to perform information communication between the first system chip and the second system chip through the serial bus interface.

In certain embodiments, the apparatus includes an embedded control unit configured to operate independently of the first system chip and the second system chip to send input information to the first system chip or the second system chip. The first system includes the embedded control unit, and the embedded control unit switches execution of processing between first input transmission processing for sending the input information to the first system chip through a first serial interface on which the first system chip is set as a master and the embedded control unit is set as a slave, and second input transmission processing for sending the input information to the second system chip through a second serial interface on which the embedded control unit is set as the master and the second system chip is set as the slave.

In certain embodiments, when an instruction to start or restart the computer is detected, the embedded control unit outputs, to the first system chip, an event to start the first OS, and outputs, to the second system chip, an event to start the second OS. The first system and the second system may share, in certain embodiments, predetermined shared information.

The first system, in certain embodiments, includes a first communication unit operably coupled to a network through wireless communication, the second system includes a second communication unit operably coupled to the network through wireless communication. In certain embodiments, the first OS and the second OS are different operating systems. Alternatively, the first OS and the second OS are instances of the same operating system.

Corresponding program products and methods are provided to implement the features of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is a table illustrating an example of information shared between two operating systems, according to examples of the present disclosure.

DETAILED DESCRIPTION

Figure 1:
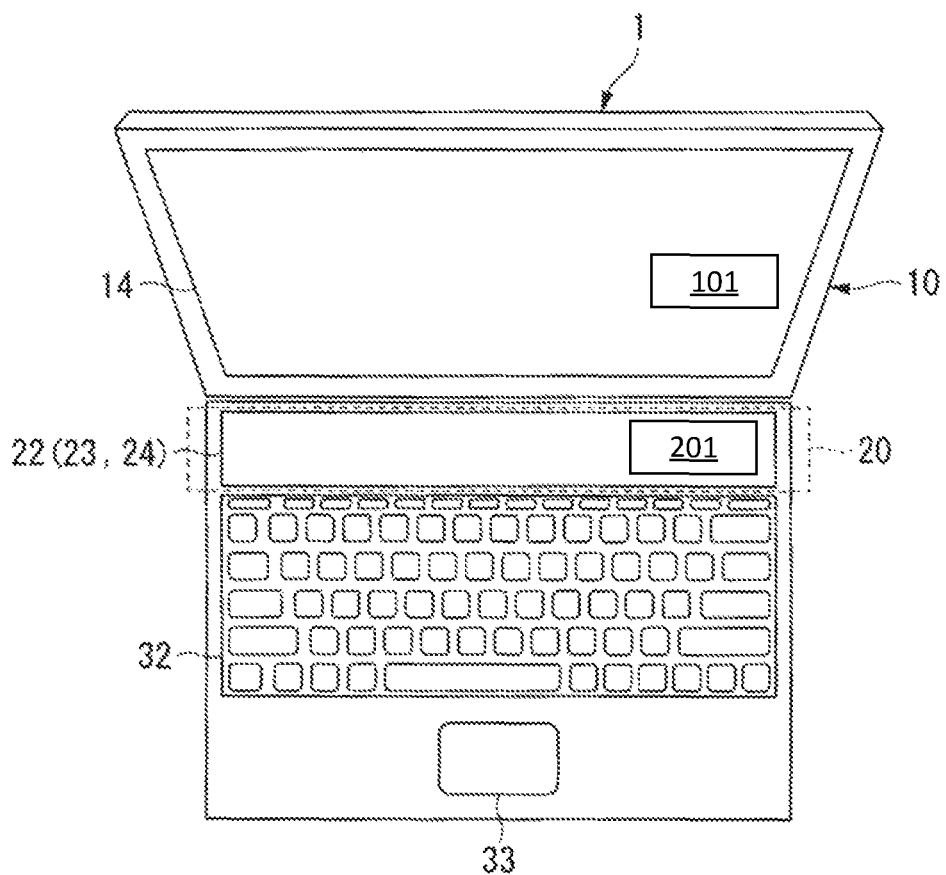
FIG. 1 is an illustration of a laptop computer, according to examples of the present disclosure.

Embodiments of the present invention will now be described in detail with reference to the drawings. In the drawings, like parts are referred to by like reference numerals.

Figure 2:
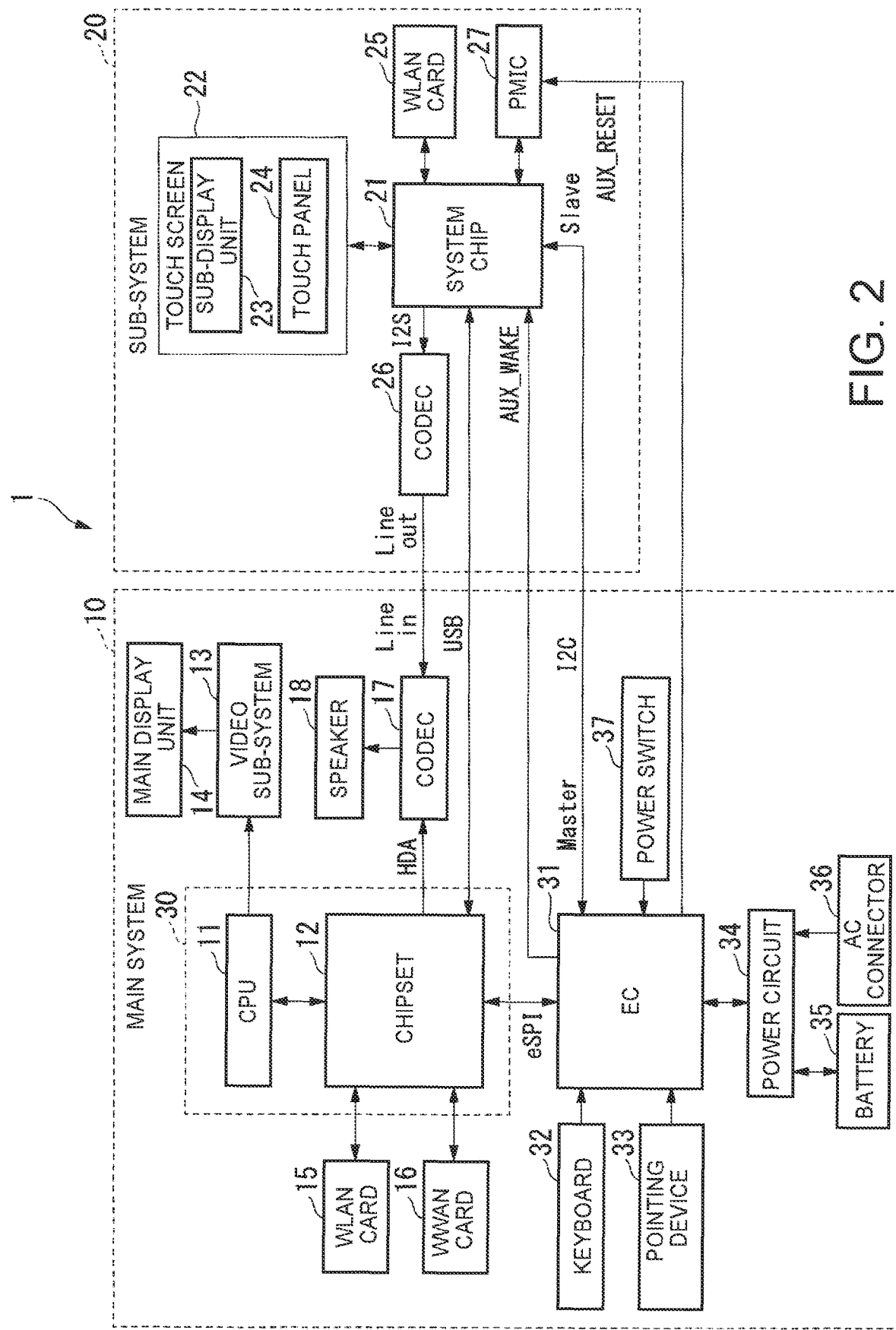
FIG. 2 is a schematic block diagram illustrating a main hardware configuration of the laptop computer, according to examples of the present disclosure.

FIG. 1 is an external view illustrating an example of a laptop personal computer ("PC") 1 according to the embodiment. FIG. 2 is a block diagram illustrating an example of the main hardware configuration of the laptop PC 1 according to certain embodiments. In certain embodiments, the laptop PC 1 will be described as an example of the information processing apparatus.

As illustrated in FIG. 1, the laptop PC 1 is a laptop personal computer (e.g., personal computing apparatus) including a main display unit 14 which displays a main screen, a keyboard 32 and a pointing device 33, and a touch screen 22 having a secondary or sub-display unit 23 and a touch panel 24. Further, the laptop PC 1 includes a main system 10 which controls the entire laptop PC 1 including the main display unit 14, the keyboard 32, and the pointing device 33, and a sub-system 20 which controls the sub-display unit 23 and the touch panel 24.

The main system 10 is a system configured to control the entire laptop PC 1, for example, by a main operating system ("OS"). One example of a main operating system is Windows® provided Microsoft Corporation of Redmond, Wash. The main system 10 has the main display unit 14 (first display unit) to execute processing by the main operating system and display, on the main display unit 14, display information based on the processing by the main operating system.

The sub-system 20 is a system configured to control an auxiliary functional unit including the sub-display unit 23 and the touch panel 24, for example, by a secondary operating system. One example of a secondary operating system includes, but is not limited to, Android® provided by Google Inc. of Mountain View, Calif. The sub-system 20 has the sub-display unit 23 (second display unit) to execute processing by the secondary operating system and display, on the sub-display unit 23, display information based on the processing by the secondary operating system.

Thus, the laptop PC 1 has two general-purpose OSs in one apparatus (main OS 101 and secondary OS 201), and these general-purpose OSs are operable in parallel (simultaneously). In other words, both the main system 10 and the sub-system 20 execute processing in parallel on the laptop PC 1.

As illustrated in FIG. 2, the laptop PC 1 includes the main system 10 and the sub-system 20. The main system 10 includes a CPU 11, a chipset 12, a video sub-system 13, the main display unit 14, a WLAN card 15, a WWAN card 16, a codec 17, a speaker 18, an EC (embedded controller) 31, a keyboard 32, a pointing device 33, a power circuit 34, a battery 35, an AC connector 36, and a power switch 37. The sub-system 20 includes a system chip 21, a touch screen 22, a WLAN card 25, a codec 26, and a PMIC 27.

In certain embodiments, the CPU (Central Processing Unit) 11 is, for example, an x86 CPU to execute various kinds of arithmetic processing by program control in order to control the entire laptop PC 1. The chipset 12 includes, in certain embodiments, controllers, such as a USB (Universal Serial Bus), a serial ATA (AT Attachment), an eSPI (Enhanced Serial Peripheral Interface) bus, a PCI (Peripheral Component Interconnect) bus, a PCI-Express bus, and an LPC (Low Pin Count) bus, and plural devices are connected to the chipset 21.

As depicted in FIG. 2, the CPU 11 and the chipset 12 correspond to a system chip 30 (an example of a first system chip). The system chip 30 executes various kinds of processing, for example, by the main or primary OS. Here, the OS is stored as a program in a nonvolatile storage device (i.e., a computer readable storage medium) that stores code executable by the system chip 30. One example of nonvolatile storage is an HDD (Hard Disk Drive), and the main OS may be stored in the HDD is read into a main memory (i.e., computer readable storage medium) such as an unillustrated DRAM (Dynamic Random Access Memory) and executed by the CPU 11. In other words, the system chip 30 executes various kinds of processing according to instructions provided by the main OS.

Further, when input information such as key input is acquired, the system chip 30 (chipset 12) uses an eSPI interface (an example of a first serial interface) to acquire the input information from an EC 31 to be described later. The system chip 30 (chipset 12) is connected to the sub-system 20 (system chip 21) through an USB interface.

The video sub-system 13 is a sub-system for implementing a function related to image display, and includes a video controller. This video controller processes a drawing command from the CPU 11 to write processed drawing information to a video memory, read this drawing information from the video memory, and output the drawing information to the main display unit 14 as drawing data (display data).

The main display unit 14 (an example of a first display unit) is, for example, a liquid crystal display or an organic EL (Electro-Luminescence) display to display a display screen as a main screen based on the drawing data (display data) output from the video sub-system 13.

The WLAN (Wireless Local Area Network) card 15 (an example of a first communication unit) connects to a network through a wireless LAN to perform data communication. For example, the WLAN card 15 performs communication for various kinds of information via the network, such as electronic mails and SNSs (Social Networking Services). The WLAN card 15 is used to connect to the network in processing by OS of the main system 10.

The WWAN (Wireless Wide Area Network) card 16 (another example of the first communication unit) connects to the network through wireless communication such as 4G (4th generation mobile communication) or 3G (3rd generation mobile communication) to perform data communication. For example, the WWAN card 16 performs communication for various kinds of information using mobile communication such as SMS (Short Message Service).

The codec 17 is, for example, an audio codec complying with the HDA (High Definition Audio) interface standard to process input/output of a sound signal (audio signal). For example, the codec 17 performs, through an HDA interface, decode processing and D/A conversion processing on a sound signal output from the chipset 12, and amplification processing through a speaker amplifier, and outputs, to the speaker 18, an analog sound signal after being subjected to the processing. Further, the codec 17 acquires, from a line-in terminal, an analog sound signal output from the sub-system 20 and outputs, to the speaker 18, a sound signal obtained by amplifying the acquired sound signal through the speaker amplifier.

The keyboard 32 is an input device such as a keyboard device or a touch panel to accept key input from a user. The pointing device 33 is an input device such as a mouse or a touch pad to accept the designation of a position mainly on the display screen, the designation or selection of an operation target (object) such as an operation button, and the like.

Note that the keyboard 32 and the pointing device 33 are an example of an input unit which accepts input information. Key input information, position designation information, operation button input information, and the like are included in the input information accepted by the keyboard 32 and the pointing device 33.

The power circuit 34 includes, for example, a DC/DC converter, a battery management unit which manages a battery 35 to be described later, a management unit for an AC/DC adapter (hereinafter called the AC adapter), and the like to convert a DC voltage supplied from the AC adapter or the battery management unit into plural voltages necessary to operate the laptop PC 1. Further, the power circuit 34 supplies electric power to each unit of the laptop PC 1 based on control from the EC 31.

Further, the power circuit 34 detects, for example, whether the AC adapter is connected to the AC connector 36 or not, and outputs, to the EC 31, connection information (connection information on the AC adapter) on whether it is connected or not. Further, the power circuit 34 detects, for example, a change in the level of the battery 35 (hereinafter called the battery level or the remaining capacity of the battery 35), and outputs the battery level to the EC 31.

The connection information on the AC adapter and the battery level may be included in the input information. The connection information on the AC adapter and the battery level are an example of battery information. The battery 35 is, for example, a lithium ion storage battery to supply DC power to each unit of the laptop PC 1 through the power circuit 34.

The AC connector 36, in certain embodiments, is a connector which connects to a DC terminal of the AC adapter to receive DC power supplied from the AC adapter and supply the DC power to each unit of the laptop PC 1 and the battery 35 through the power circuit 34. The power switch 37 is a control switch for starting or restarting the laptop PC 1. When the user holds down the power switch 37, the power switch 37 outputs, to the EC 31, a trigger event signal indicating that the power switch 37 is held down.

The EC 31 (an example of an embedded control unit) is a one-chip microcomputer which monitors and controls various devices (peripheral devices, sensors, and the like) regardless of the system state of the laptop PC 1. In other words, the EC 31 operates independently of the system chip 30 and the system chip 21.

Further, the EC 31 has a power management function to control the power circuit 34. The EC 31 is composed of a CPU, a ROM, a RAM, and the like, which are not illustrated, and equipped with multi-channel A/D input terminal and D/A output terminal, a timer, and a digital input/output terminal. To the EC 31, for example, the keyboard 32, the pointing device 33, the power circuit 34, the power switch 37, and the like are connected through these input/output terminals, and the EC 31 controls the operation of these components.

The EC 31 is connected to the chipset 12 through the eSPI interface or the like on which the chipset 12 (system chip 30) is set as a master and the EC 31 is set as a slave. Further, the EC 31 is connected to the system chip 21 through an I2C (Inter-Integrated Circuit) interface (an example of a second serial interface) on which the EC 31 is set as the master and the system chip 21 is set as the slave.

When detecting an instruction to start or restart the own apparatus (laptop PC 1) such as that the power switch 37 was held down, the EC 31 outputs, to the system chip 30 (chipset 12), an event to start the OS. Further, the EC 31 outputs, to the system chip 21, an event (AUX_WAKE signal) to start Android (registered trademark). Further, when starting the OS of the main system 10 after initialization, the EC 31 outputs, to the PMIC 27 to be described later, an AUX_RESET signal indicative of initialization to initialize the OS of the sub-system 20.

Then, the EC 31 sends the input information to the system chip 30 or the system chip 21. Specifically, the EC 31 switches the execution of processing between first input transmission processing for sending the input information accepted by the keyboard 32 and the pointing device 33 to the system chip 30 through the eSPI interface, and second input transmission processing for sending the input information to the system chip 21 through the I2C interface. In response to predetermined key input on the keyboard 32, the EC 31 switches the execution of processing between the first input transmission processing and the second input transmission processing described above. Here, the predetermined key input is, for example, key input as a combination of "Alt" key+"F7" key.

The system chip 21 (an example of a second system chip) is, for example, an SoC (System on Chip) including an ARM® core to centrally control the sub-system 20 including the touch screen 22. The system chip 21 executes the OS and programs stored, for example, in an unillustrated nonvolatile memory such as a flash memory. In other words, the system chip 21 executes various kinds of processing by the OS.

When acquiring input information on key input and the like, the system chip 21 uses the I2C interface to acquire the input information from the EC 31. The system chip 21 functions as a virtual memory (for example, a virtual EEPROM (Electrically Erasable Programmable Read Only Memory)) accessible from the I2C interface when acquiring the input information. The system chip 21 monitors a writing event to the virtual memory and converts the writing event to an input event of input information.

The system chip 21 is also connected to the system chip 30 through the USB interface to perform information communication between the system chip 30 and the system chip 21 through the USB interface. The touch screen 22 is arranged, for example, on a chassis side face of the laptop PC 1 and has the sub-display unit 23 and the touch panel 24.

The sub-display unit 23 (an example of the second display unit) is, for example, a liquid crystal display or an organic EL display to display a sub-screen. For example, the sub-display unit 23 displays various icons, battery information, notifications from the main system 10 such as that of e-mail, and the like. The touch panel 24 (an example of a touch detection unit) is arranged to overlap with the sub-display unit 23 in order to detect a touch operation on the sub-display unit 23 with an operation medium. Here, the operation medium is a user's finger, a touch pen, or the like.

The WLAN card 25 (an example of a second communication unit) connects to the network through the wireless LAN to perform data communication. For example, the WLAN card 25 performs communication for various kinds of information via the network, such as electronic mails and SNSs (Social Networking Services). The WLAN card 25 is used to connect to the network in processing by the OS of the sub-system 20.

The codec 26 is an audio codec which processes input/output of a sound signal (audio signal). The codec 26 performs, through an I2S (Inter-IC Sound) interface, decode processing and D/A conversion processing on a sound signal output from the chipset 12, and amplification processing through the speaker amplifier, and outputs, from a line-out terminal, an analog sound signal after being subjected to the processing. The codec 26 outputs the sound signal from the line-out terminal to the line-in terminal of the codec 17 on the side of the main system 10 to output the sound signal from the speaker 18 through the codec 17.

The PMIC (Power Management Integrated Circuit) 27 controls the power supply of the sub-system 20. In response to the AUX_RESET signal output from the EC 31, the PMIC executes reset processing (initialization processing) on the sub-system 20.

Referring next to the drawings, the operation of the laptop PC 1 according to the embodiment will be described. First, the operation between the main system 10 and the sub-system 20 using the USB interface will be described.

As illustrated in FIG. 2, the chipset 12 of the main system 10 and the system chip 21 of the sub-system 20 are connected through the USB interface (an example of a general-purpose serial bus interface) to perform information communication between the system chip 30 and the system chip 21 through the USB interface. Note that both the main system 10 and the sub-system 20 execute processing simultaneously in parallel. For example, the system chip 30 uses the USB interface to send the sub-system 20 information held by the main system 10 or information displayed on the main display unit 14 as shared information in order to display the shared information on the sub-display unit 23 of the sub-system 20. In other words, when the chipset 12 of the system chip 30 sends the shared information to the system chip 21 using the USB interface, the system chip 21 displays, for example, the shared information on the sub-display unit 23 of the touch screen 22.

Here, the shared information includes information such as the date and time, location, and weather, and the shared information is displayed, for example, on the respective display units (the main display unit 14 and the sub-display unit 23) and shared between the main system 10 and the sub-system 20. Further, during the processing of an application program (hereinafter called an application) of the OS, when an event occurs, such as e-mail (electronic mail), SNS, or SMS, the chipset 12 uses the USB interface to send the sub-system 20 a command including a notification corresponding to the event.

In response to the command received using the USB interface, for example, the system chip 21 displays, on the sub-display unit 23, the notification corresponding to the event. Further, for example, the system chip 21 displays, on the sub-display unit 23, an application icon of the main system 10, and when the icon is specified with a touch operation on the touch panel 24, the system chip 21 uses the USB interface to send the system chip 30 event information indicating that the icon is specified. For example, the system chip 30 starts an application corresponding to the specified icon to display a display screen of the application on the main display unit 14.

Next, operation when sound is output from the sub-system 20 to the speaker 18 of the main system 10 will be described. When sound is output from the sub-system 20 to the speaker 18, the system chip 21 uses the I2S interface to output a sound signal to the codec 26, and the codec 26 outputs the sound signal from the line-out terminal. Next, the codec 17 acquires, from the line-in terminal, the sound signal output from the codec 26, amplifies the sound signal using the speaker amplifier, and outputs the amplified sound signal to the speaker 18. The speaker 18 outputs sound based on the sound signal output from the codec 17. Thus, the speaker 18 can be used in such a manner as to be shared between the main system 10 and the sub-system 20 on the laptop PC 1.

Next, operation when input information accepted by the keyboard 32 and the like is used in the sub-system 20 will be described. When the sub-system 20 uses input information from the keyboard 32, the EC 31 first monitors the keyboard 32. When the keyboard 32 accepts input information, the EC 31 uses the I2C interface to send the input information to the system chip 21. The system chip 21 uses the I2C interface to acquire the input information from the EC 31 and uses the input information for various processing in the sub-system 20. Thus, the input device such as the keyboard 32 can be used in such a manner as to be shared between the main system 10 and the sub-system 20 on the laptop PC 1.

Next, the operation of starting or restarting the main system 10 and the sub-system 20 will be described. When the power switch 37 is held down, for example, when the power switch 37 is held down by the user, the power switch 37 outputs, to the EC 31, a trigger event signal indicating that the power switch 37 is held down.

In response to the trigger event signal indicating that the power switch 37 is held down, the EC 31 starts or restarts the system chip 30 through the chipset 12. Further, the EC 31 outputs the AUX_WAKE signal to the system chip 21 to start or restart the sub-system 20. Further, for example, when a reset event such as system reset is detected, the EC 31 initializes the system chip 30 through the chipset 12 and outputs the AUX_RESET signal to the PMIC 27 to initialize the sub-system 20.

Next, sharing of information between the main system 10 and the sub-system 20 according to the embodiment will be described. FIG. 3 is a table illustrating an example of shared information shared between two OSs in the embodiment. As illustrated in FIG. 3, for example, shared information in the category of general information includes the date and time, battery information, location (area), and weather. For example, when the shared information such as the date and time, the location, and the weather is shared with the sub-system 20, the chipset 12 of the main system 10 uses the USB interface to send these pieces of shared information to the system chip 21 of the sub-system 20.

Further, for example, when the battery information is shared with the sub-system 20, the EC 31 of the main system 10 uses the I2C interface to send the battery information to the system chip 21 of the sub-system 20. Note that the battery information includes the remaining capacity (%) of the battery 35, the connection status of the AC adapter to the AC connector 36, and the like, and based on the battery information received from the EC 31, the system chip 21 displays, on the sub-display unit 23, an icon (for example, an icon indicative of the battery level) corresponding to the battery information.

Further, for example, the shared information includes notifications from the main system 10, and the notifications include, for example, e-mail (electronic mail), calendar (schedule), message, phone call, SMS, and alarm (clock alarm). When these notifications are shared, the chipset 12 uses the USB interface to send the system chip 21 of the sub-system 20 notification commands to give these notifications. Based on the notification commands, the system chip 21 displays, on the sub-display unit 23, the notifications such as e-mail (electronic mail), calendar (schedule), message, phone call, SMS, and alarm (clock alarm).

Further, for example, when information is shared according to voice instructions, the chipset 12 uses the USB interface to send the state of voice assistant (such as listening, thinking, speaking, or error) to the system chip 21 of the sub-system 20. For example, the system chip 21 displays, on the sub-display unit 23, an icon indicative of the state of voice assistant received.

Further, for example, when control information such as the volume in a media player is shared, the system chip 21 displays, on the sub-display unit 23, a control screen for the media player. Here, the media player is an application executed in the main system 10 to play back music, and the sub-system 20 is used, for example, as a controller of the media player. In this case, when the touch panel 24 detects a touch operation to perform control of the controller, the system chip 21 uses the USB interface to send the control information to the system chip 30 (chipset 12) of the main system 10. Based on the control information received, the system chip 30 operates the media player.

As described above, the laptop PC 1 (information processing apparatus) according to the embodiment includes the main system 10 (first system) and the sub-system 20 (second system), where both the main system 10 and the sub-system 20 execute processing in parallel. The main system 10 has the main display unit 14 (first display unit), executes processing by the primary OS, and displays, on the main display unit 14, display information based on the processing by the primary OS. The sub-system 20 has the sub-display unit 23 (second display unit), executes processing by the secondary OS, and displays, on the sub-display unit 23, display information based on the processing by the OS.

Thus, since the laptop PC 1 according to the embodiment is such that the main system 10 and the sub-system 20 use respective general-purpose OSs, the development environments of the general-purpose OSs can be used to make multi-functionalization easy such as to add a function(s) to the main system 10 and the sub-system 20. Therefore, the laptop PC 1 according to the embodiment can improve function extensibility and hence improve convenience.

Further, since the laptop PC 1 according to the embodiment is such that both the main system 10 and sub-system 20 execute processing in parallel, processing can be executed in cooperation between the main system 10 and the sub-system 20 or the processing can be distributed therebetween. This can make it easy to extend the functions, and hence a system with a high degree of freedom can be built.

Further, in the embodiment, the main system 10 includes the system chip 30 (first system chip) to execute processing by the primary OS. The sub-system 20 includes the system chip 21 (second system chip) to execute processing by the secondary OS. The system chip 30 and the system chip 21 are connected through a general-purpose serial bus interface (for example, the USB interface) to perform information communication between the system chip 30 and the system chip 21 through the general-purpose serial bus interface.

Therefore, since the laptop PC 1 according to the embodiment is such that communication can be performed easily between the main system 10 and the sub-system 20, processing can be executed in cooperation between the main system 10 and sub-system 20. Further, the laptop PC 1 according to the embodiment includes the EC 31 (embedded control unit) operating independently of the system chip 30 and the system chip 21 to send input information to the system chip 30 or the system chip 21. Therefore, since the laptop PC 1 according to the embodiment is such that the input information can be used appropriately by both the system chip 30 and the system chip 21, convenience can be improved. For example, the laptop PC 1 according to the embodiment is such that input through the keyboard 32 can be shared between the system chip 30 and the system chip 21.

Further, in the embodiment, the main system 10 includes the EC 31 described above. The EC 31 switches the execution of processing between the first input transmission processing and the second input transmission processing. The first input transmission processing is processing for sending the system chip 30 input information through the first serial interface (for example, the eSPI interface) on which the system chip 30 is set as the master and the EC 31 is set as the slave. Further, the second input transmission processing is processing for sending the system chip 21 input information through the second serial interface (for example, the I2C interface) on which the EC 31 is set as the master and the system chip 21 is set as the slave. The input information includes key input information accepted by the keyboard 32 and the pointing device 33, position designation information, operation button input information, connection information on the AC adapter, battery information such as the battery level, and the like.

Thus, since the laptop PC 1 according to the embodiment can use the input unit (such as the keyboard 32 and the pointing device 33) for the primary OS of the main system 10 as the input unit for the secondary OS of the sub-system 20, convenience can be improved. Further, in the embodiment, when an instruction to start or restart the own apparatus (laptop PC 1) is detected, the EC 31 outputs, to the system chip 30, an event to start the primary OS, and outputs, to the system chip 21, an event to start the secondary OS. Thus, the laptop PC 1 according to the embodiment can start (or restart) both operating systems appropriately.

Further, in certain embodiments, the main system 10 and the sub-system 20 share predetermined shared information. Note that the predetermined shared information includes, for example, information as illustrated in FIG. 3. Thus, the laptop PC 1 according to the embodiment can use the shared information for various uses, and hence extensibility and convenience can be improved.

Further, in the embodiment, the main system 10 includes the WLAN card 15 (first communication unit) connectable to the network through Wireless communication. The sub-system 20 includes the WLAN card 25 (second communication unit) connectable to the network through wireless communication. Therefore, the main system 10 and the sub-system 20 can acquire and send information through the network, respectively, and this can improve convenience.

Further, in certain embodiments, the first general-purpose OS and the second general-purpose OS are different general-purpose OSs. Therefore, the laptop PC 1 according to the embodiment can take advantages of characteristics of the respective general-purpose OSs to build a system with high versatility and convenience.

Note that the present disclosure is not limited to the aforementioned embodiments, changes may be made without departing from the scope of the present invention. For example, in the aforementioned embodiments, the example of being applied to the laptop PC 1 as an example of the information processing apparatus is described, but the present invention is not limited to this example. The present invention may also be applied to any other information processing apparatus such as a tablet PC, a PDA (Personal Digital Assistant), or a smartphone.

Further, in the aforementioned embodiment, the example in which the main system 10 executes processing by the primary OS, and the sub-system 20 executes processing by the secondary OS is described, but the present disclosure is not limited to this example. For example, both the main system 10 and the sub-system 20 may each execute a version of the same OS.

Further, in the aforementioned embodiments, the example in which the main system 10 includes the EC 31, but the present invention is not limited to this example, and the sub-system 20 may include the EC 31. In this case, communication between the EC 31 and the system chip 30 (chipset 12) may be performed through the I2C interface on which the EC 31 is set as the master and the system chip 30 (chipset 12) is set as the slave.

Further, in the aforementioned embodiments, the example in which the input information includes connection information on the AC adapter, the battery level, the key input information, the position designation information, the operation button input information, and the like, but the present invention is not limited to this example. The input information may also include any other input information such as detection information of a temperature sensor, or the like.

Further, in the aforementioned embodiments, the shared information illustrated in FIG. 3 is described as an example of shared information between the main system 10 and the sub-system 20, but the present invention is not limited thereto, and any other information may also be shared.

Further, in the aforementioned embodiments, the example in which the input unit (for example, the keyboard 32 and the pointing device 33) and the audio output (for example, the speaker 18) are shared between the main system 10 and the sub-system 20 is described, the present invention is not limited to this example, and any other component may also be shared. For example, the laptop PC 1 may share the WLAN card 15 (25) and the WWAN card 16, and antennas for WLAN and WWAN.

Note that each of the components of the laptop PC 1 described above internally has a computer system, respectively. Then, a program for implementing the function of each component included in the laptop PC 1 described above may be recorded on a computer-readable recording medium so that the program recorded on this recording medium will be read into the computer system and executed to perform processing in each component included in the laptop PC 1 described above. Here, the fact that "the program recorded on the recording medium is read into the computer system and executed" includes installing the program in the computer system. Here, the "computer system" includes the OS and hardware such as peripheral devices.

Further, the "computer system" may also include two or more computers connected through a network such as the Internet, WAN, LAN, or a communication line like a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

A recording medium internally or externally provided to be accessible from a delivery server for delivering the program is included as the recording medium. Note that the program may be divided into plural pieces, downloaded at different timings, respectively, and then united in each component included in the laptop PC 1, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is sent through the network. The above-mentioned program may also be to implement some of the functions described above. Further, the program may be a so-called differential file (differential program) capable of implementing the above-described functions in combination with a program(s) already recorded in the computer system.

Further, some or all of the functions described above may be realized as an integrated circuit such as LSI (Large Scale Integration). Each of the above-described functions may be implemented by a processor individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

What is claimed is:

1. A computing apparatus comprising:
a first system having a first system chip and a first display unit and configured to execute processing by a first operating system ("OS"), and configured to display, on the first display unit, display information based on the processing by the first OS;
a second system having a second system chip and a second display unit and configured to execute processing by a second OS, and configured to display, on the second display unit, display information based on the processing by the second OS;
wherein both the first system and the second system execute processing in parallel; and
a third system comprising an embedded control unit that is independent of the first system and the second system and is configured to send input information to the first system or the second system, and wherein the embedded control unit switches execution of processing between first input transmission processing for sending the input information to the first system chip through a first serial interface on which the first system chip is set as a master and the embedded control unit is set as a slave, and second input transmission processing for sending the input information to the second system chip through a second serial interface on which the embedded control unit is set as the master and the second system chip is set as the slave.

2. The computing apparatus of claim 1, wherein:
the first system chip is configured to execute the processing by the first OS,
the second system chip is configured to execute the processing by the second OS, and
the first system chip and the second system chip are connected through a serial bus interface to perform information communication between the first system chip and the second system chip through the serial bus interface.

3. The computing apparatus of claim 2, further comprising an embedded control unit configured to operate independently of the first system chip and the second system chip to send the input information to the first system chip or the second system chip.

4. The computing apparatus of claim 3, wherein the first system includes the embedded control unit.

5. The computing apparatus of claim 4, wherein when an instruction to start or restart the computer is detected, the embedded control unit outputs, to the first system chip, an event to start the first OS, and outputs, to the second system chip, an event to start the second OS.

6. The computing apparatus of claim 1, wherein the first system and the second system share predetermined shared information.

7. The computing apparatus of claim 1, wherein:
the first system includes a first communication unit operably coupled to a network through wireless communication; and
the second system includes a second communication unit operably coupled to the network through wireless communication.

8. The computing apparatus of claim 1, wherein the first OS and the second OS are different operating systems.

9. The computing apparatus of claim 1, wherein the first OS and the second OS are instances of the same operating system.

10. A program product comprising a non-transitory computer readable storage medium that stores code executable by a processor, the executable code comprising code to:
display information on a first display unit of a personal computing apparatus based on processing by a first system, wherein the first system comprises the first display unit and is configured to execute processing by a first operating system ("OS");
display information on a second display unit of the personal computing apparatus based on processing by a second system, wherein the second system comprises the second display unit and is configured to execute processing by a second OS;
execute, in parallel, processing by both the first system and the second system; and
operate independently from the first system or the second system a third system comprising an embedded control unit that switches execution of processing between first input transmission processing for sending input information to a first system chip through a first serial interface on which the first system chip is set as a master and the embedded control unit is set as a slave, and second input transmission processing for sending the input information to a second system chip through a second serial interface on which the embedded control unit is set as the master and the second system chip is set as the slave.

11. The program product of claim 10, further comprising code to:
    execute processing by the first system chip, wherein the first system chip is configured to execute the processing by the first OS;
    execute processing by the second system chip, wherein the first system chip is configured to execute the processing by the second OS; and
    perform information communication between the first system chip and the second system chip, wherein the first system chip and the second system chip are connected through a serial bus interface.

12. The program product of claim 11, further comprising code to send the input information to the first system chip or the second system chip.

13. The program product of claim 12, wherein the first system includes the embedded control unit.

14. The program product of claim 13, further comprising code to detect a request to start or restart a personal computing device and, in response, output to the first system chip, an event to start the first OS, and outputs, to the second system chip, an event to start the second OS.

15. The program product of claim 10, further comprising code to share, between the first system and the second system, predetermined shared information.

16. The program product of claim 10, further comprising code to:
    communicate wirelessly, by a first communication unit of the first system, with a network; and
    communicate wirelessly, by a second communication unit of the second system, with the network.

17. The program product of claim 10, wherein the first OS and the second OS are different operating systems.

18. The program product of claim 10, wherein the first OS and the second OS are instances of the same operating system.

19. A method comprising:
    displaying information on a first display unit of a personal computing apparatus based on processing by a first system, wherein the first system comprises the first display unit and is configured to execute processing by a first operating system ("OS");
    displaying information on a second display unit of the personal computing apparatus based on processing by a second system, wherein the second system comprises the second display unit and is configured to execute processing by a second OS;
    executing, in parallel, processing by both the first system and the second system; and
    operating independently from the first system or the second system a third system comprising an embedded control unit that switches execution of processing between first input transmission processing for sending input information to a first system chip through a first serial interface on which the first system chip is set as a master and the embedded control unit is set as a slave, and second input transmission processing for sending the input information to a second system chip through a second serial interface on which the embedded control unit is set as the master and the second system chip is set as the slave.

20. The method of claim 19, further comprising:
    processing by the first system chip, wherein the first system chip is configured to execute the processing by the first OS;
    processing by the second system chip, wherein the second system chip is configured to execute the processing by the second OS; and
    communicating between the first system chip and the second system chip, wherein the first system chip and the second system chip are connected through a serial bus interface.

* * * * *